May 27, 1958  P. R. ADAMS ET AL  2,836,815
AIRCRAFT RADIO NAVIGATION SYSTEM
Filed Oct. 16, 1953  7 Sheets-Sheet 1

INVENTORS
PAUL R. ADAMS
ROBERT I. COLIN
BY
Ernest Fanwick
ATTORNEY

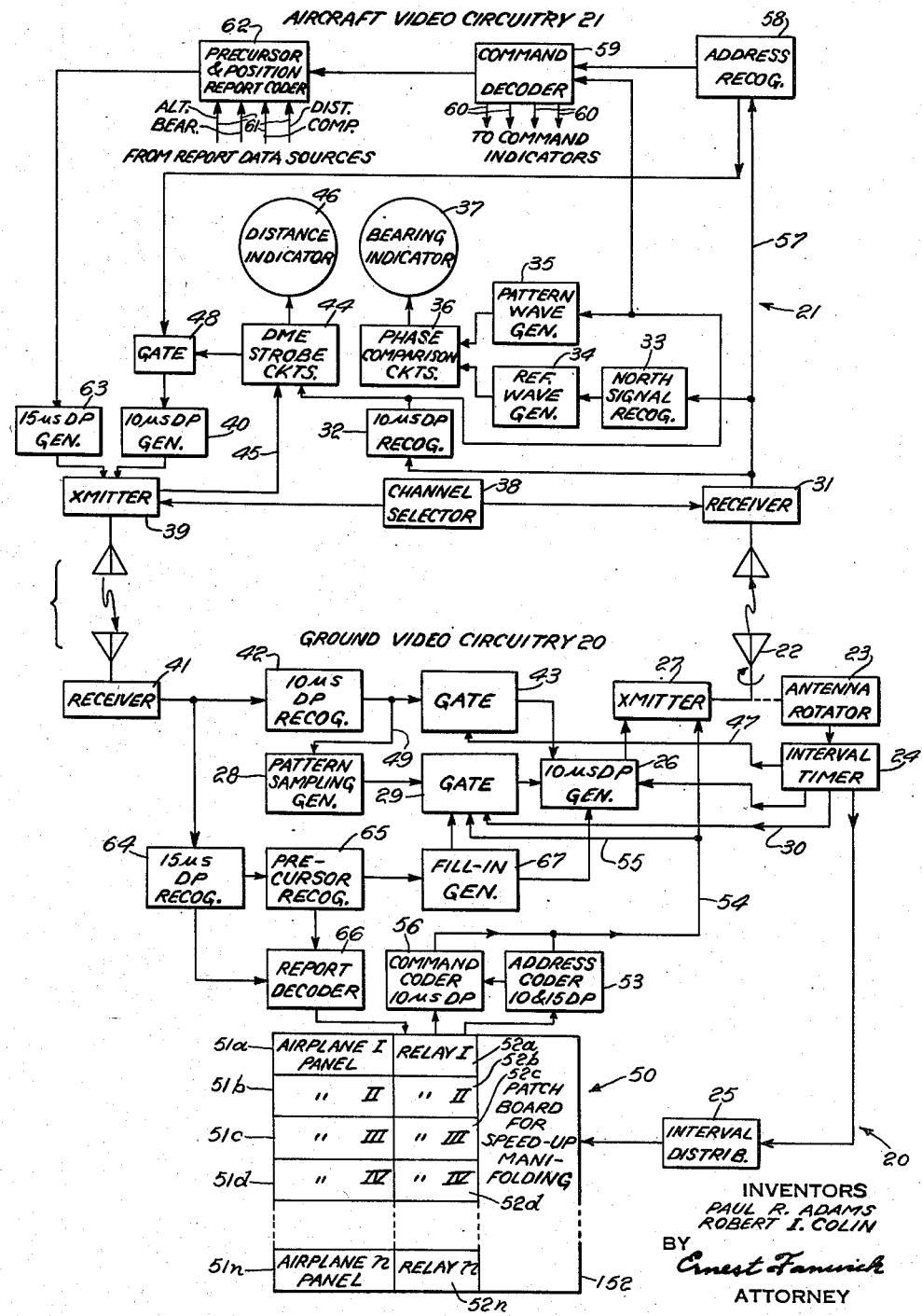

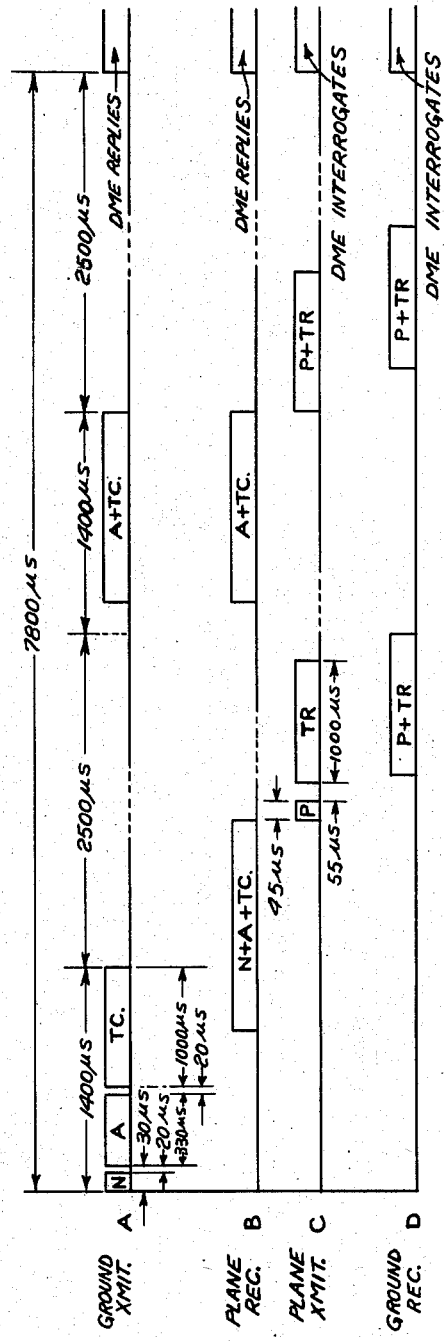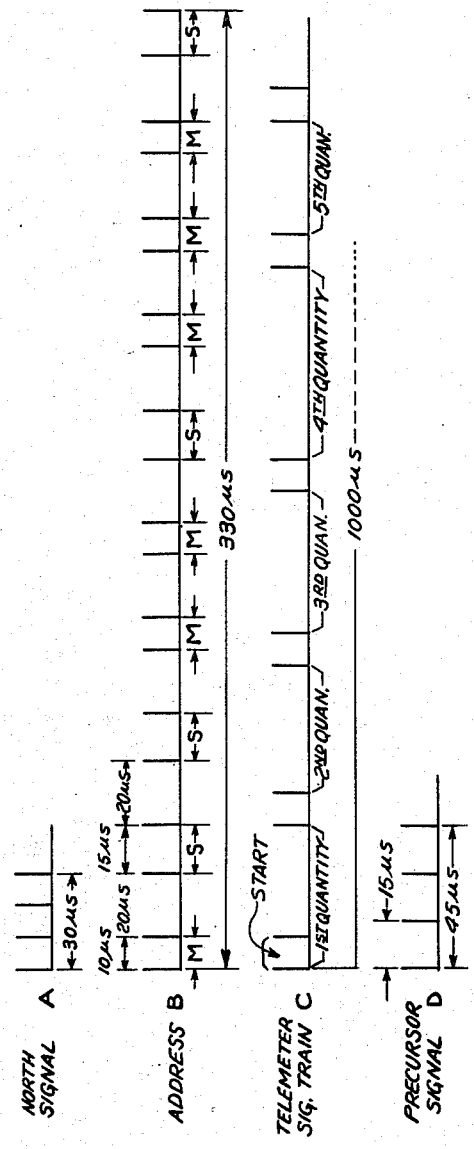

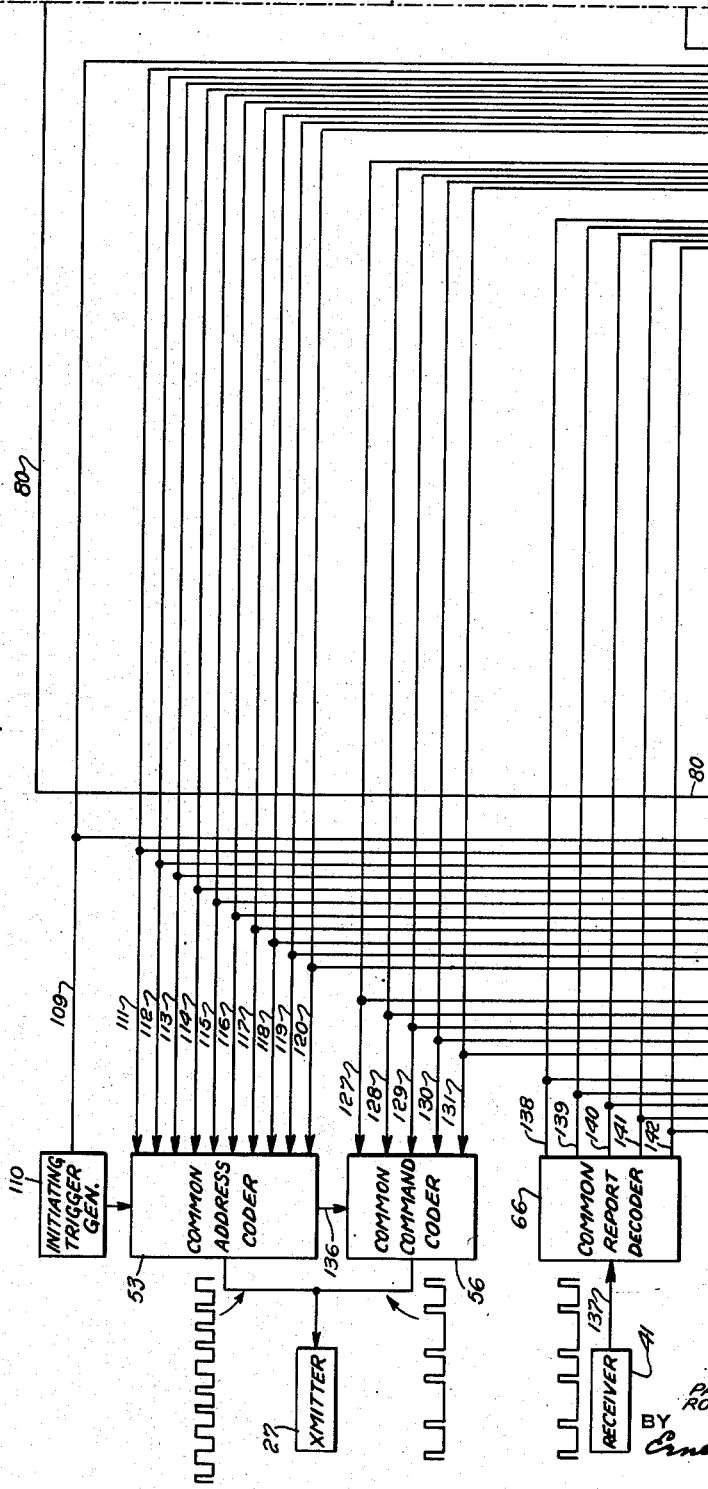

May 27, 1958 P. R. ADAMS ET AL 2,836,815
AIRCRAFT RADIO NAVIGATION SYSTEM
Filed Oct. 16, 1953 7 Sheets-Sheet 5

INVENTORS
PAUL R. ADAMS
ROBERT I. COLIN
BY
Ernest Fanwick
ATTORNEY

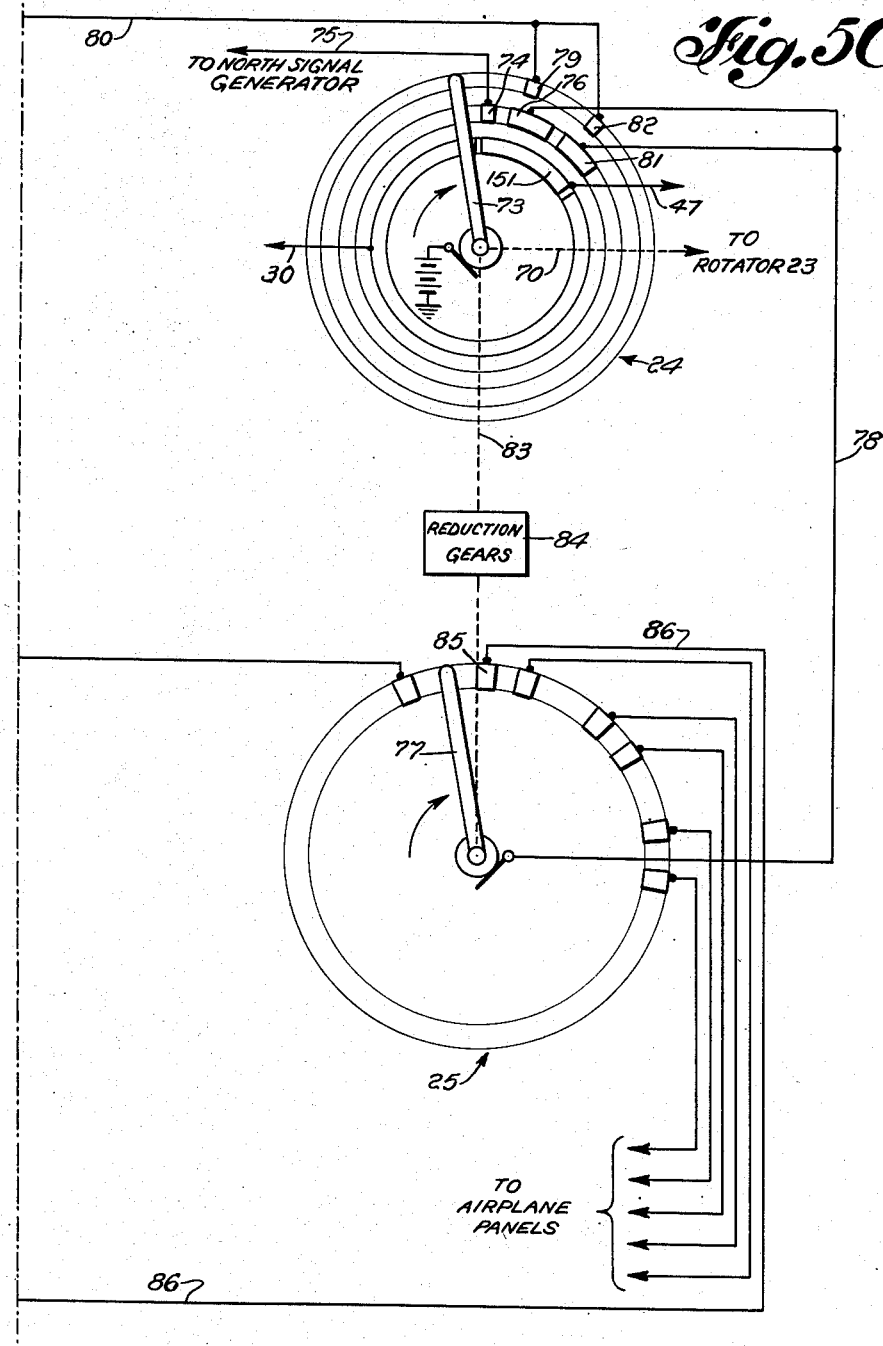

May 27, 1958 P. R. ADAMS ET AL 2,836,815
AIRCRAFT RADIO NAVIGATION SYSTEM
Filed Oct. 16, 1953 7 Sheets-Sheet 7
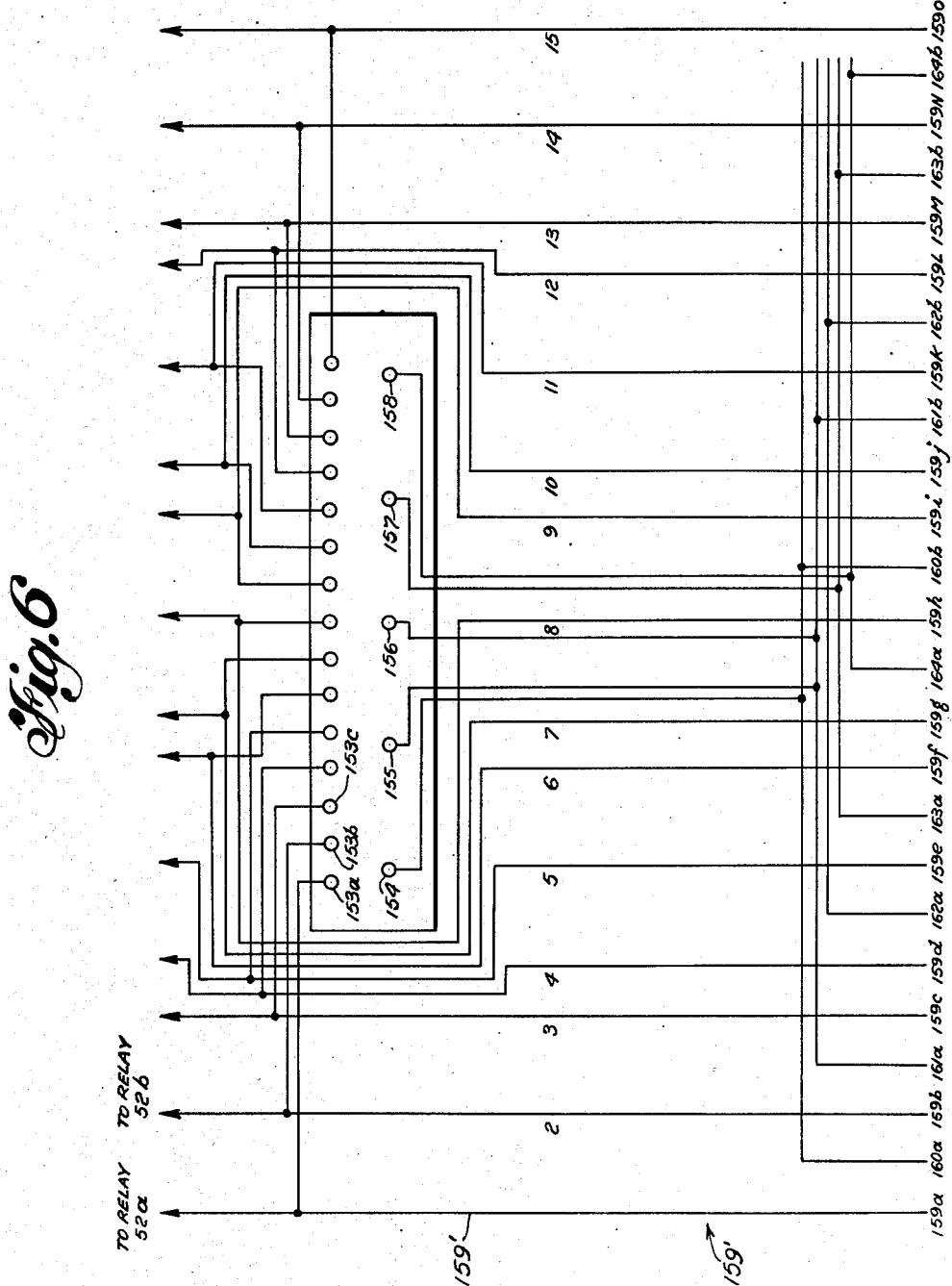
INVENTORS
PAUL R. ADAMS
ROBERT I. COLIN
BY
Ernest Fanwick
ATTORNEY

United States Patent Office 2,836,815
Patented May 27, 1958

2,836,815

AIRCRAFT RADIO NAVIGATION SYSTEM

Paul R. Adams, Montclair, and Robert I. Colin, Nutley, N. J., assignors to International Telephone and Telegraph Corporation, Nutley, N. J., a corporation of Maryland Application October 16, 1953, Serial No. 386,574

20 Claims. (Cl. 343—106)

This invention relates to radio navigation systems and more particularly to homing and interception aids for aircraft.

In the tactical operation of aircraft a pilot is required to solve two basic navigational problems, the first of which comprises the task of interception, i. e. he must leave his base position and arrive at a designated destination point from which the execution of his assigned mission, such as a surveillance patrol, organizational rendezvous, rescue patrol, or interception of other aircraft, may be accomplished. In some tactical situations it is necessary for different aircrafts or groups of airplanes to be assigned to different destination points. The second basic navigational problem confronting a pilot is the task of homing to his base position upon the completion of his assigned mission. This requires the pilot to have sufficient information in a suitable and convenient form for reaching a point sufficiently near to his base to enable an approach and landing to be made by visual contact or by special means, such as instrument landing systems (ILS) or ground control approach systems (GCA).

In order to solve the two basic navigation problems confronting a pilot, he must be provided with various pieces of information or navigational coordinates. This information must be provided in a simple and speedy manner by equipment which is relatively small and light and not prohibitively costly. Homing can be accomplished by use of conventional direction finding techniques; however, for military purposes the radio transmissions of conventional direction finding (low, medium, or high frequency) can be received at great distances enabling an enemy to detect and locate the airplane's home base. In addition it is possible for an enemy to jam the transmissions or emit false signals, causing the aircraft to be led astray. It is also possible for confusion to result from the fact that these frequencies are extremely overcrowded, and mutual interference is bound to occur under usual tactical conditions. Antennas for use with conventional direction finding techniques provide a serious aerodynamic drawback when used aboard an airplane of modern design. A further disadvantage of known airborne direction finding techniques is the fact that the homing flight will not in general be a direct flight to the base because of the effects of crosswinds.

Heretofore there has been developed a pulse type homing beacon which operates in the ultra-high frequency range permitting the assignment of many channels. At these frequencies propagation is limited to line of sight or horizon distances reducing the possibility of detection or jamming by an enemy. Due to the pulse type transmission, the enemy is required to know the exact codings and have available specialized equipment before he is capable of emitting false signals. This known pulse type homing beacon system comprises an omidirectional radio range whose ground equipment is suitable for all base installations including aircraft carriers. Meter indications aboard the aircraft provide a simple visual indication of bearing. By using known bearing selector indicators and deviation meters, a selected radial may be conveniently and accurately flown as a direct homing path even in the presence of crosswinds and without reference to any other navigational instruments. The nature of this homing beacon system is such as to allow the use of distance measuring equipment (DME) which is integrated with the pulse type homing beacon equipment. The addition of DME to the pulse type homing beacon provides a pilot with accurate meter indications of his distance and bearing from the transmitter or home base. Thus, the above equipment has efficiently solved one basic navigational need of the pilot, i. e. the problem of homing. It is also possible to utilize the above equipment for interception purposes by having the pilot fly his aircraft to designated distance and bearing coordinates from which he may commence his mission.

The above equipment, however, does not provide any means for communicating to the airplane any change in the location of the desired destination. Present radio telegraphy and telephony communication means are not satisfactory considering the need for secrecy, accuracy, and speed in informing the pilot of his assigned destination or any change in his assigned destination. The pilot is placed under an undue strain when he is required to constantly monitor the communication channels, and the information is susceptible of misinterpretation since it is not presented in semi-permanent or visual form. It is extremely desirable that destination information be transmitted from the home base to any particular aircraft in some form of secrecy code and in a manner which may enable the information to be readily decoded by the pilot into flight corrections which he must make to comply with the flight orders. In addition only the pilot who is required to take action should receive the message orders although the system must be capable of transmitting orders to any one of a large number of aircraft. In this manner many aircraft, in any desired grouping, can be quickly, conveniently, and safely deployed to approach a variety of assigned destinations in accordance with the changing requirements of a tactical situation.

A further use to which such facilities may be applied, if they are fast enough, is to replace the presently used radio telephone channel utilized for transmitting approach and landing information to the pilot which is gathered by a precise radar set located at the base, such as is presently used in the ground control approach "blind" landing system.

It is also highly desirable that automatic position reporting means be provided, on the aircraft, which is capable of accurately reporting the position of the airplane to the base automatically without any attention from the pilot. These reports should be coded and rendered speedily with means to identify the airplane which is reporting, so that the home base may distinguish between a large plurality of aircraft.

One of the objects of this invention, therefore, is to provide a complete aircraft radio navigational aid system, which includes homing and distance facilities and interception command and position reporting facilities capable of operating in the ultra-high frequency portion of the spectrum, in which all transmissions are coded and extreme economy in equipment weight and complexity, particularly airborne, is exercised.

Another object of this invention is to provide an aircraft radio navigational aid system which is substantially automatic in its operation and is capable of providing homing, distance measuring, interception command and position reporting services for a large number of airplanes operating from one homing base without any mutual interference.

A further object of this invention is to provide an aircraft radio navigational aid system which is capable of being integrated in a usual instrument landing or ground control approach system.

A feature of this invention is the use of a pulse type combined omnirange and distance measuring equipment in which the ground transmitter emits a plurality of "pattern sampling signals" whose amplitudes are modulated by the antenna system. The antenna pattern is rotated so that a receiver at a distant location will receive a succession of pulses varying in amplitude in accordance with the antenna pattern. Each time the reference axis of the antenna array is aligned with a reference direction, such as north, during the course of its rotation, a reference signal is radiated. From the pattern sampling signals the receiver detects the envelope of the pulse amplitudes. The phase of the envelope wave varies proportionately with the bearing of the receiver from the transmitter. Phase comparison circuits compare the pattern wave with the north signal derived wave furnishing an azimuth indication. By proper interrogation and responder means, the pattern sampling signals are utilized as distance measuring signals with equipment in the aircraft determining the time of transit between interrogation and response from which distance may be measured. A portion of the antenna duty cycle is reserved for interception command and position reporting, whose messages are converted to pulse code modulation and thus replace the distance measuring pulses during the portion of the duty cycle utilized for interception command and position reporting.

A further feature of this invention is the provision for increasing the speed of service to a predetermined number of selected airplanes over and above the speed of service to the remainder of the aircraft serviced by the system of this invention.

The above-mentioned and other features and objects of this invention will become more apparent by reference to the following description taken in conjunction with the accompanying drawings, in which:

Fig. 2 is a schematic diagram in block form of one embodiment of the radio navigation system in accordance with the principles of this invention;

Fig. 3 is a graphic illustration of the duty cycle of the transmitter and receiver shown in Fig. 2;

Fig. 4 is graphic illustration of the pulse coded signals utilized in the transmissions of the systems shown in Fig. 2;

Figs. 5A, 5B and 5C are schematic diagrams partly in block form of the ground beacon equipment of the system shown in Fig. 2;

Figure 1A:
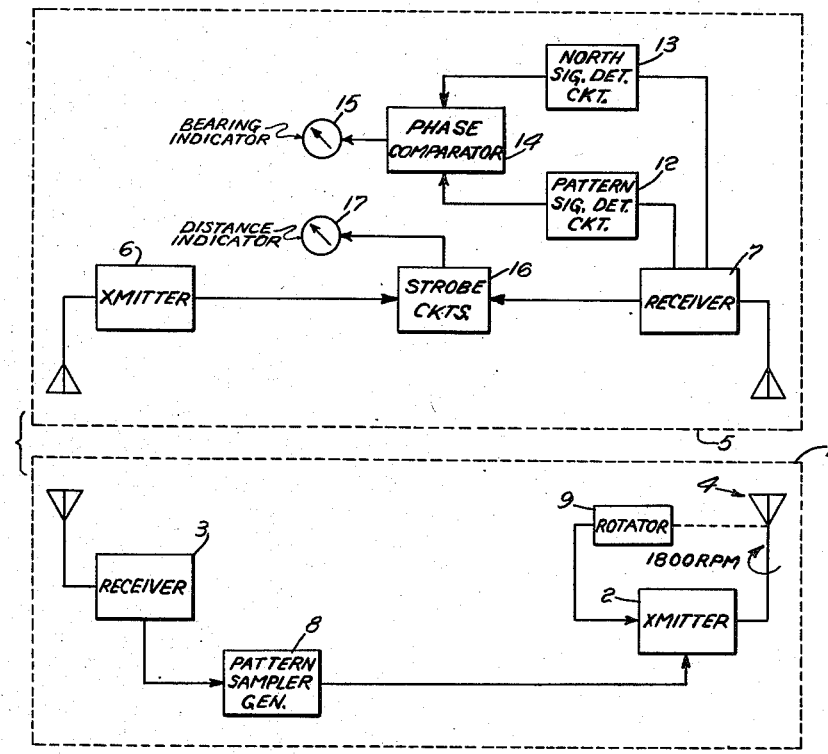
Fig. 1A is a schematic diagram in block form of a known homing and distance measuring beacon system.
Figure 1B:
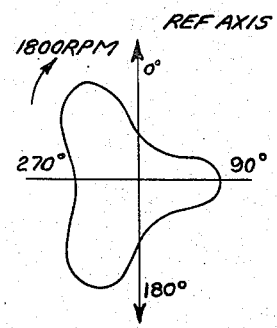
Figs. 1B and 1C are graphic illustrations of the radiation patterns of the system shown in Fig. 1A.
Figure 1C:
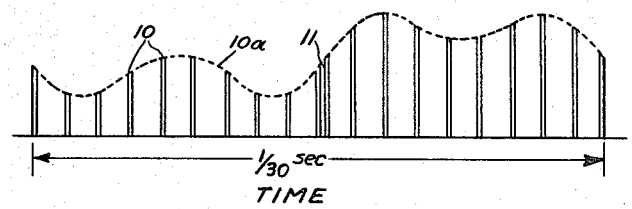

Referring to Fig. 1A, a pulse type homing beacon-distance measuring radio navigation system is shown wherein the base or ground equipment 1 comprises a transmitter 2, receiver 3, and antenna system 4 while the airborne equipment 5 comprises a transmitter 6, receiver 7, and the necessary measuring circuits as hereinafter explained. The ground equipment 1 includes a generator 8 which in the absence of interrogation pulses generates pattern sampling signals at a random rate but of sufficient quantity to provide approximately 2000 pulses per second. These pulses are coupled to the transmitter 2 where they are emitted by antenna 4. Antenna rotator 9 causes the antenna pattern of antenna 4 to be rotated at a predetermined velocity, such as 1800 revolutions per minute. A polar plot of the radiation pattern characteristics of antenna 4 is shown in Fig. 1B. This radiation pattern is rotated at approximately 1800 revolutions per minute due to rotator 9. Each time the antenna pattern passes through an arbitrary reference point, such as north, the rotator 9 triggers transmitter 2 thus causing the transmitter 2 to emit a burst of pulses which are distinct from the usual pattern sampling signals. The pattern sampling signals emitted by antenna 4 are amplitude modulated in accordance with the antenna characteristics. Thus as shown in Fig. 1C, the homing beacon transmission comprises a group of pattern sampling pulses 10 plus a reference signal pulse group 11 whose amplitudes are modulated in accordance with the radiation pattern characteristics of antenna 4. The amplitude modulated pattern sampling pulses 10 are received aboard the aircraft in receiver 7 and as shown in Fig. 1C the envelope wave 10A of the pulse signals is reconstructed in pattern signal detector circuit 12. The phase variation between the envelope wave of the pattern signal pulses and a pure sine wave generated in response to the north signal pulses detected in north signal detector circuit 13 is measured in the phase comparison circuit 14 and the bearing indication of the transmitter 2 from receiver 7 is shown on meter 15.

In order to obtain a distance measuring reading, the airborne transmitter 6 emits a group of random DME (distance measuring equipment) interrogation pulses which are received by ground receiver 3 and these interrogation pulses synchronize the pattern sampler generator 8 to emit reply pulses which are an image of the interrogation pulses and are substituted for the pattern sampling signal pulses 10 heretofore used to obtain the bearing indication. When these interrogation pulses are received by airborne receiver 7, strobe circuit 16 detects those reply signals which are identical with the interrogations emitted by its own transmitter 6 and utilizes the time difference between the transmitted interrogation pulses and the reply pulses to actuate indicator 17 to give a distance reading of equipment 1 from equipment 5.

In order to provide a complete aircraft radio navigation system it is necessary to provide in addition to the distance and azimuth measuring equipment, means to communicate message signals such as interception commands to an individual plane and means to receive a position report from a plane.

Referring to Fig. 2, a schematic diagram in block form of a complete aerial navigation system in accordance with the principles of this invention is shown, comprising ground equipment 20 and mobile unit or aircraft equipment 21, wherein for purposes of clarity and explanation, only the means for transmitting and receiving interception command and position report data is shown and the means for utilization and/or display of such information is not shown. When there are no airplanes in the immediate vicinity of the ground beacon 20, the azimuth or bearing portion of the navigation system is produced essentially by the physical rotation of antenna array 22 which as heretofore explained, has a certain directional pattern in the horizontal plane. Antenna array 22 is caused to rotate by antenna rotator 23 which also controls the interval timer 24 and the interval distributor 25. When the rotating antenna array 22 is aligned due north (or at any other arbitrary predetermined direction) the interval timer 24 responsive to the antenna rotator 23 causes the 10 microsecond double pulse generator 26 to couple a distinctive burst of pulses to transmitter 27 whose output is coupled to antenna array 22 which emits the north signal omnidirectionally. The beacon transmitter 27 is supplied with approximately 2000 pattern sample signals per second. The pattern sampling signals are generated in generator 28 and coupled through gate circuit 29 to cause the 10 microsecond double pulse generator 26 to couple the double pulse pattern sample signals to the transmitter 27. The gate 29 passes the trigger signals from generator 28 to generator 26 only during that portion of the antenna cycle that the interval timer 24 emits a gating signal over line 30 to gate 29. The constant amplitude pulses from generator 26 responsive to the output of generator 28 are coupled to the transmitter 27 whose output is radiated by antenna array 22 causing the pattern sampling pulses to be of different amplitudes in different directions due to the directional pattern characteristics of the antenna array 22 which may be assumed to be rotating steadily at the rate of 1800 revolution per minute (R. P. M.) or 30 revolutions per second (R. P. S.) due to antenna rotator 23. Thus an airborne receiver 31 located some distance from antenna 22 will receive a succession of pattern sampling signal double pulses varying in amplitude in accordance with the directional pattern of antenna 22 and will also receive the distinctive burst of pulses identifying the north signal. This cycle will repeat itself identically every $\frac{1}{30}$ of a second.

The airborne receiver 31 detects the radiations of antenna array 22 and couples the detected signals to a 10 microsecond double pulse recognition circuit 32 and a north signal recognition circuit 33. The distinctive burst of pulses forming the north signal cause recognition circuit 33 to emit a signal which initiates and synchronizes the output of reference wave generator 34. Since the pattern sampling signal pulses are of 10 microsecond duration the output of recognizer circuit 32 is coupled to a pattern wave generator 35 which reconstructs the envelope wave of the pattern sampling pulses. The envelope wave output of generator 35 and the reference wave output of generator 34 are coupled to phase comparison circuits 36 where they are compared in phase. Since the envelope wave will vary in phase depending upon the bearing of receiver 31 from antenna 22 and the reference wave will be of constant phase the output of the phase comparator circuits will be indicative of the bearing of transmitter 27 from receiver 31 and is displayed on bearing indicator 37.

The radiated pattern of antenna 22 is so designed that it is not a pure sinusoid in order that the reconstituted pattern envelope wave may be resolved into harmonics of the antenna rotation rate thus increasing the accuracy of the bearing indication because the phases of the harmonic components are also used in the comparison circuits 36, ambiguities being resolved by the phase comparison of the fundamental components.

The pattern sampling signals represent the amplitudes of the antenna pattern shape at discrete intervals of time. Since each complete antenna rotation cycle occurs in $\frac{1}{30}$ of a second or 33,333 microseconds and the sampling signals occur approximately every 500 microseconds approximately 60 samples of the fundamental antenna pattern wave are sent to receiver 31 by transmitter 27. These 60 pattern sampling signals are sufficient to enable receiver 31 to reconstruct the pattern wave which conforms to the original antenna pattern with only negligible distortion due to the gaps between the pattern sampling signals. The ground to air channel from transmitter 27 to receiver 31 contains pulse signals for other facilities in addition to or as partial or full replacement for the regular pattern sampling signals, just described, without affecting the operation of the bearing system since the purpose of the pattern sampling signals is merely to act as a medium to be "molded" in shape by the rotating antenna 22. It is only necessary that the additional or substitute signals be absolutely identical in amplitude as far as the output of transmitter 27 is concerned, so that all variations in amplitude detected by receiver 31 are due solely to the antenna characteristics; and in no case are signals lacking for more than approximately 500 microseconds so that the synthesized pattern wave is a true copy of the original transmitter signals. In addition it is essential that no signals be radiated which might interfere with reception of the north signal, nor should the antenna pattern of antenna 22 have any nulls since any additional signals radiated for any other functions must never be entirely suppressed.

In order to obtain a distance indication as the aircraft approaches the site of antenna array 22 the pilot selects a predetermined one of a plurality of channels by means of a channel selector 38. The channel selector 38 determines a pair of operative radio frequencies, one for reception by airborne receiver 31 and the other for transmission by airborne transmitter 39. Of course it is obvious that many mobile units can be tuned to one ground beacon frequency. The airborne transmitter 39 responsive to the output of 10 microsecond double pulse generator 40, emits an average of 200 double pulse distance measuring interrogation signals per second whose rate is intentionally allowed to "wobble" randomly by plus or minus 20%. The base beacon receiver 41 "listens" for these 10 microsecond double pulse interrogation signals which after detection are recognized and passed by 10 microsecond double pulse recognition circuit 42 whose output pulses are coupled through gate 43 and act as trigger pulses for the 10 microsecond double pulse generator 26. The output of generator 26 is coupled to transmitter 27 and radiated by antenna array 22. The output of antenna array 22 is a plurality of 10 microsecond double pulse signals having the identical random rate as the interrogation signals emitted by transmitter 39. These signals are detected by airborne receiver 31 and coupled to 10 microsecond double pulse recognition circuit 32 whose output is used as one input to the distant measurement strobe circuits 44. The other input to distant measurement strobe circuits 44 comprises the distance measuring interrogation signal from transmitter 39 coupled via line 45. The strobe circuits 44 in the aircraft compare the 10 microsecond reply signals detected by recognition circuit 32 with the interrogation signals emitted by transmitter 39 and indicate a distance measurement of the ground beacon from the aircraft on distance indications meter 46 when the received reply pulses are identical in rate with the emitted interrogation pulses. During certain portions of antenna array 22 rotation cycle, as hereinafter explained, it is essential to suppress DME interrogations and reply signals. During this portion of the antenna rotation cycle interval timer 24 couples a signal via line 47 to open gate 43 thus preventing the ground beacon from replying to any interrogation signals. In order to prevent the aircraft from interrogating the ground beacon during this portion of the cycle gate 48 is opened and in response to circuit 58 recognition that an address coding was transmitted, a signal is coupled to generator 40 to prevent any interrogation signals being coupled to transmitter 39. If 100 airplanes are in the vicinity of the base and are interrogating the beacon, approximately 2,000 double pulse reply signals per second are emitted by transmitter 27 and all these signals are picked up by all aircraft in the vicinity. However, the strobe circuits 44 in each airplane automatically and quickly examines all reply pulses and determines which particular set of 20 pulses per second correspond to its own distinctive random interrogating rate. The strobe circuits 44 converts the time delay between interrogation signal emissions and reply signal receptions into a distance indication on meter 46. As the number of airplanes which are interrogating the beacon increases there is less need for the regular pattern sampling signals from generator 28 since the DME reply signals can be substituted therefor. Thus, the output of recognition circuit 42 is coupled over line 49 to cause the output of generator 28 to automatically and progressively decrease in quantity until the regular pattern sampling signals initiated by generator 28 are completely eliminated when sufficient DME interrogations and, therefore, reply signals are being transmitted.

The primary reason for turning off the emission of regular pattern sampling signal pulses is to save power, since any transmitter has a limit as regards the number of pulses which it can radiate per second without overheating or burning out the transmitting tubes. In addition, the presence of 2,000 pattern sampling signals plus 2,000 DME reply signals would add unnecessarily to the job of recognition which the strobe circuits 44 must perform in order to obtain a distance measurement.

Since the aerial navigation system of this invention must operate under all eventualities and under all conditions and the number of airplanes in flight are, in general, unpredictable, the ground beacon installation has a provision that when no airplanes are interrogating the beacon 2,000 regular pattern sampling signals (double pulses) per second are radiated, and as more and more airplanes interrogated regular pattern sampling signals are automatically and progressively decreased in number until the regular pattern sampling signals are completely eliminated when sufficient DME interrogations are received. Thus, the operation of the DME portion of the beacon transmitter is at substantially a constant duty cycle.

In order to perform the additional functions of interception command and position reporting the air-to-ground channel must carry the coded position reports as well as DME interrogations while the ground-to-air channel must carry coded address signals and coded command signals as well as DME replies, north signals, and pattern sampling signals. The address and command signals in the ground-to-air channel serve as additional or replacement pattern sampling signals.

The antenna rotator 23 which initiates the north signals also serves as a control for an interval timer 24 to initiate and synchronize the command and reporting intervals and also performs auxiliary functions necessary to avoid interference.

After the distinctive burst of pulses representing the north signal are emitted by antenna 22, the interval timer 24, responsive to the antenna rotator 23, couples a signal to the interval distributor 25, whose output is coupled to a control board 50. The control board 50 comprises a plurality of control panels 51a, 51b, 51c etc., one for each airplane the system is capable of handling. Associated with each control panel is a relay 52a, 52b, 52c etc. The signal from the interval distributor selectively closes one of the relays 52 causing a signal which is distinctive for each plane to be coupled from control panel 51 to the address coder 53, which converts the signal from panel 51 into a plurality of 10 and 15 microsecond, double pulses to form a signal address train whose pulse code is distinctive for each airplane and is preset into control panel 51. This address signal train is coupled via line 54 to transmitter 27 and radiated by antenna 22. In addition to the address, each airplane control panel 51 has interception command data preset in it which may be distinct for each plane and comprises information such as altitude, bearing, distance and the course that the ground beacon desires the airplane to proceed along. After a sufficient length of time has elapsed for the transmission of the address signal train, the interception command data from control panel 51 is coupled through relay 52 to a common command coder 56 where the information is encoded to form a signal train of 10 microsecond pulses which are coupled via line 54 to transmitter 27. During the transmission of the command data signal train, gate 29 remains open due to the signals on line 55 preventing any pattern sampling trigger pulses from reaching generator 26 from generator 28.

The address and interception command signal trains radiated by antenna 22 are detected in airborne receiver 31 whose output is coupled via line 57 to an address recognition circuit 58. If the address transmitted by ground beacon 20 matches the address of the receiving aircraft preset into recognition circuit 58 the following interception command signal train is coupled to command decoder 59 whose output is coupled to utilization or display devices via lines 60.

In order for the aircraft to report its position to the base, data is compiled from the navigation instruments and coupled over lines 61 to a precursor and position report coder 62. The precursor portion of circuit 62 emits a distinctive burst of pulses which act as a warning signal to the base equipment 20 that a position report follows immediately. The position report coder 62 accepts the information from lines 61 and encodes it into a telemeter pulse signal train to convey the information to the ground equipment 20. This signal train is similar and comprises the same information channels as the interception command signal train emitted by the base equipment 20. The precursor and position report signals are transformed into a signal train of 15 microsecond double pulse by generator 63 whose output is coupled to airborne transmitter 39 and sent out to ground equipment 20 where receiver 41 detects the signals and couples them to a 15 microsecond double pulse recognition circuit 64. The output of circuit 64 is coupled to a precursor recognition circuit 65 so that on reception of a precursor signal the output of circuit 65 alerts the position report decoder circuit 66 to the fact that a position report is being coupled into circuit 66 from recognition circuit 64. The output of decoder 66 is coupled through relay 52 to control panel 51 for the particular airplane and the position of that airplane is displayed on a duplicate set of navigational instruments contained in panel 51.

Since, during the interval when a precursor signal and position report are being received, the DME signals are suppressed and since it is essential to the operation of the bearing information portion that signals should be transmitted periodically, the output of the precursor recognition circuit 65 is coupled to a fill-in pattern sampling signal generator 67 whose output is controlled so that it will not interfere with the reception of position report signals.

During each rotation of antenna array 22 two aircraft are contacted and each aircraft is addressed in turn, the reply from the addressed aircraft is received before the next aircraft is addressed, thus only one airplane is transmitting its position report at any one time. This roll call system, initiated and synchronized from the ground, avoids all interference between transmissions from different airplanes or between transmission and reception at the same place. Since necessary two-way communication channel for the roll call system is established for DME purposes and the bearing system already includes a shaft whose rotation controls the antenna 22 and which times the transmission of the north signal, the shaft may be used to initiate the calls at the proper time, thus enabling a great saving in equipment.

Referring to Fig. 3, the time separations of the various navigational functions at the ground and airborne stations are shown. For purposes of explanation it is assumed that our antenna pattern rotates at 1800 revolutions per minute and that our system is capable of handling 200 individual airplanes, each one being called at least once every 3⅓ seconds, thus requiring 1/60 of a second to call two airplanes. Referring to the ground beacon transmission duty cycle, shown in curve A, it is seen that the first 30 microseconds are reserved for the transmission of the north pulse reference signal N and that during this time all other transmissions are suppressed. During the first interval of time comprising 7800 microseconds, including the period immediately after the transmission of the north signal, the triggering of the ground beacon for the radiation of DME replies is suppressed. The portion of this interval, approximately 1400 microseconds is utilized to radiate a north signal N and complete address A and telemetered command TC to one airplane. Since two airplane calls are to be transmitted every 1/30 of a second, this first airplane may be designated odd and the second airplane called may be designated even. During the interval of time necessary to radiate the complete address A and telemetered command TC to one airplane, the regular sampling signals are suppressed and these sampling signals are specially controlled during the next interval of 2500 microseconds which is utilized for receiving the complete telemetered position report from the airplane. The next interval of time of approximately 1400 microseconds is utilized to radiate the complete address and telemetered command A+TC to the second airplane designated even followed by an interval of 2500 microseconds during which the position reply is received from the even plane. Since operation of the azimuth facility requires sampling signals at least every 500 microseconds, a complete absence of such signals during listening intervals is avoided by utilizing "fill-in" sampling signals under control of the position report "precursor" signal at instants when no telemetered code pulse can possibly arrive. Following the interval of time of approximately 7800 microseconds reserved for the radiation of complete address and commands to both an odd and even airplane and the time reserved for their replying, the normal radiation of DME reply and/or sampling signals is continued. The airborne receiver duty cycle shown in curve B of Fig. 3 comprises the reception of the north signal N during which DME interrogations are silenced to permit the airborne receiver to listen for two consecutive odd-even calls and reply to one of them if the pulse coded address corresponds to the predetermined address of the receiving plane. This silencing of DME air interrogation also prevents interference with ground reception of position reports from other airplanes located at any distance. Should the receiving airplane receive its identifying address, the time interval following the radiated address calls is reserved for reply with its precursor signal and telemetered position report as shown in Curve C. After the time reserved for any possible reception of a telemetered position report by the ground receiver the normal DME interrogations are resumed.

The aerial navigation system of this invention is capable of handling a plurality of airplanes; each airplane requiring a 10-element address signal, a 5-channel telemeter command signal, and a 5-channel telemeter report signal in addition to the usual DME and omi-range signals.

It is extremely desirable that every signal transmitted or received by the navigation system of this invention be composed of double pulse elements or "doublets." By utilizing double pulses the average power and hence the range is increased without need for using higher peak powers which in an airplane is impractical because it would require higher voltages which are extremely difficult to obtain at high altitudes. In addition, since both the base and air receivers "accept" or "recognize" a signal element only if it is composed of two (or more) pulses of definite spacing, a large proportion of unrelated pulses such as are due to noise or other channel interference will be rejected, thus reducing the chances of interference and error.

In order to achieve a greater separation between certain types of signals two different sizes of doublets are used in each channel; one doublet comprising two pulses spaced 10 microseconds apart while the other doublet comprises two pulses spaced 15 microseconds apart.

As shown in Fig. 4 curve A the north signal, emitted when the antenna array 22 is aligned due north, comprises a group of four pulses having a spacing of 10 microseconds between adjacent pulses. The north signal may be considered as two pulse doublets of 10 microseconds each with a 10 microsecond spacing between.

Following the north signal a complete address signal train is sent out by the base transmitter. Since an address is a distinctive item of information rather than a continuous variable, a binary code is utilized. The code is similar to the mark-space code used in telegraphic printing transmissions with each mark M comprising a 10 microsecond doublet and each space S comprising a 15 microsecond doublet. To insure a greater degree of accuracy, positive mark and space signals M and S are used rather than using the absence of a mark signal to indicate a space.

Since as many as ten beacons may be operating in the same vicinity, a system composed of 1,000 unique addresses is required to allow 100 planes to be in contact with each beacon without mutual interference from adjacent beacons. Since 1,000 addresses are required, a 10 element code should be used to allow 1024 permutations each designating a unique address. As shown in Fig. 4 curve B, one 10 element address code comprises 10 mark or space doublets (10 or 15 microseconds each) spaced 20 microseconds apart, thus requiring a total time allowance of 330 microseconds to transmit one address.

After the address is transmitted, the ground beacon emits a telemeter signal train. It is actually necessary to provide only four quantitative information channels in each interception command or position report signal in order to convey altitude, bearing, direction and distance indication, however a fifth information channel is provided and may be used as a vernier scale for one of the other information channels if greater accuracy is desired or it may be used as a channel for transmitting "attention" or "acknowledgment" signals or other "canned" messages.

If a quantitative information item is conveyed by a proportional code using, as shown in Curve C, Fig. 4, six 10 microsecond doublets to convey the quantitative data for the five information channels, the magnitude of the first quantity is proportional to the time spacing between the first and second pulse doublets and the magnitude of the second quantity is proportional to the time between the second and third pulse doublets, etc. If a maximum time for conveying information between doublets is allowed which is equal to 200 microseconds a total period of 1,000 microseconds is necessary to transmit a telemetered signal train.

Alternately, the telemeter signal train may comprise a start-stop pulse code which requires a pulse doublet to initiate the timing of each information channel and a pulse doublet to indicate the elapsed time for that channel's quantitative measurement. Such a system requires a total of 10 pulse doublets instead of the six pulse doublets in Curve C.

The DME interrogations, replies, and pattern sampling signals either regular or fill-in comprise 10 microsecond pulse doublets.

The airplane must transmit in addition and prior to a position report, which utilizes the same telemeter signal train code as is used by the ground beacon in transmitting an interception command, a precursor signal which as shown in Fig. 4 Curve D is composed of a distinctive burst of four pulses each 15 microseconds apart. This signal may be considered equal to two 15 second pulse doublets 15 microseconds apart. One purpose of the precursor system is to initiate the "fill-in" sampling signal operation and it also warns the ground station that a position report is about to follow, so that ground transmissions can be automatically suppressed temporarily to insure quiet during certain specific intervals, while ensuring that adequate pattern sampling signals are transmitted safely "between the lines of the incoming position report."

Figure 5B:
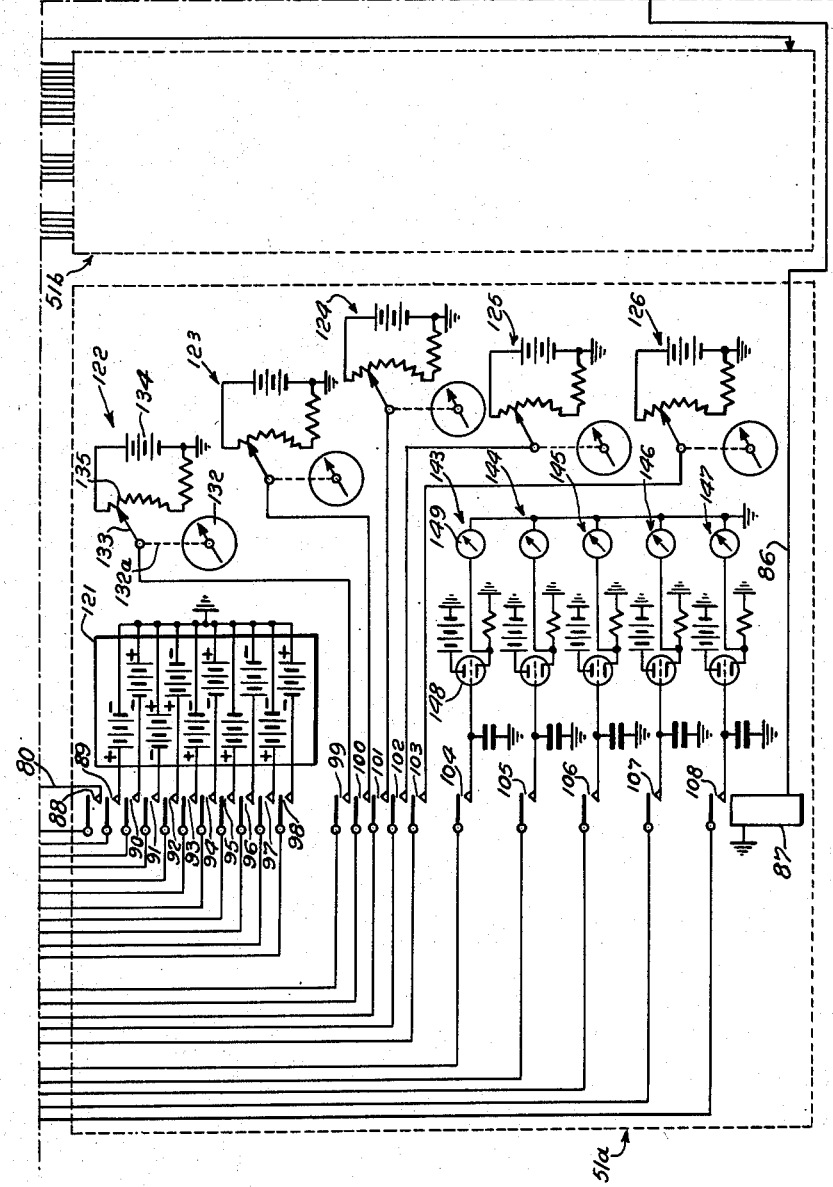
Figure 5D:
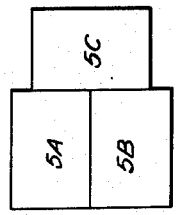
Fig. 5D is a schematic diagram to show the relationship of Figs. 5A, 5B and 5C; and, Fig. 6 is a schematic circuit diagram of the patch board for speed-up manifolding used with the system shown in Fig. 2.

Referring to Figs. 5A, 5B and 5C a schematic diagram helpful in illustrating the interval timing and distribution portions of a radio navigation system in accordance with the principles of this inventon is shown, comprising an interval timer 24, an interval distributor 25, and an airplane panel 51A with additional airplane panels indicated by 51B. For purposes of clarity in the explanation only one greatly enlarged segment of both the interval timer 24 and the interval distributor 25 is shown. As the rotating antenna array 22 is aligned due north, the rotating arm 73 of the interval distributor 24 makes contact with the north contact 74 causing a signal to be coupled over line 75 to initiate the emission of the distinctive north signal. The arm 73 of the interval timer 24 rotates at the same rate of speed as antenna array 22 since it is mechanicaly coupled to antenna rotator 23 by linkage 70. After making contact with north signal contact 74 rotating arm 73 makes contact with an odd plane relay contact 76 and a signal is coupled to the rotating arm 77 of the interval distributor 25 over line 78. During the contact of rotating arm 73 with segment 76 contact is also made with a start transmitting contact 79 and a signal is coupled over line 80. After passing over the odd plane relay contact 76 rotating arm 73 makes contact with even plane relay contact 81 and another start transmitting contact 82, thus causing signals to be transmitted over lines 78 and 80. The rotating motion from the antenna rotator which is coupled to the interval timer 24 is also coupled over mechanical linkage 83 and through a reduction gear box 84 to the rotating arm 77 of the interval distributor 25. After the north signal is emitted, rotating arm 77 makes contact with segment 85 of the interval distributor 25 causing a signal to be emitted over line 86. The signal from line 86 is coupled to an individual airplane control panel 51A shown in Fig. 5B and activates relay 87 causing switches 88—108 to close. As switch 88 closes, the signal which was coupled over line 80 is coupled to bus bar 109 causing the initiating trigger generator 110 to emit a signal to the common address coder 53. Simultaneously, switches 89—98 are closed and a distinctive address code is coupled to the address coding bus bars 111—120, thus a ten element address is emitted from the common address coder 53 and coupled to the transmitter 27. The address signals are obtained from a plurality of voltage sources in equipment 121. If a positive signal is coupled to an address bus bar, a "mark" M signal is generated in address coder 53, and if a negative signal is coupled to an address bus bar, it causes a "space" S signal to be emitted by address coder 53. The address setup in this illustration comprises M S S M M S M M M S. Obviously any address code may be preset into control panel 51A by changing the polarity of the voltage sources in equipment 121.

Simultaneously, with the closing of address switches 89—98 command switches 99—103 are closed coupling command input circuits 122—126 to be coupled to the command bus bars 127—131. A typical command input circuit 122 comprises a meter or dial 132 which may be manually rotated to the desired indication such as altitude, distance, or bearing. When the dial is rotated, mechanical coupling 132a causes moving arm 133 to couple a voltage from source 134 to the command bus bar 127 through switch 99. As arm 133 is moved dependent upon dial 132, the resistance introduced by resistance 135 varies, thus causing the voltage from source 134 to be dependent upon the position of dial 132. When the common address coder 43 has completed generating the address, a signal is coupled over line 136 to the common command coder 56 which then emits a pulse coded signal dependent upon the potentials carried by command bus bars 127—131 and this pulse coded command is coupled to transmitter 27. Since the plane that recognizes the address emitted by the address coder 53 must send back a precursor and telemetered report switches 104—108 are also closed and the received telemetered report is coupled from receiver 41 over line 137 to common report decoder 66 whose output comprises five potentials dependent upon the signals coupled from the receiver over line 137. These potentials are impressed on report busses 138—142 and coupled through switches 104—108 to report indicating circuits 143—147. Each report indicating circuit such as 143 comprises an amplifying tube 148 and associated circuits whose output is coupled to a voltmeter 149 whose dial may be calibrated in accordance with the item or data which is being received. The cycle above described is now complete for the first airplane and rotating arm 77 of the interval distributor 25 causes the cycle to be repeated for the next plane when contact is made with the segment of the interval distributor associated with that plane. As hereinbefore explained, during the time necessary for transmission and reception of the north signal and addressing and receiving the replies from two planes the DME itnerrogation and replies are suppressed. This is accomplished by causing a signal to be emitted over line 47 when rotating arm 73 of the interval timer makes contact with DME suppressor segment 151.

In actual use there often arises an operational need for a provision which will allow an accelerated calling rate for a small number of aircraft under unusual circumstances, such as airplanes in danger of running out of gas, carrying wounded or particularly needing automatic landing instructions. The patch board 152 for speed-up manifolding provides such a service by allowing the pulses which ordinarily would go to the control panels 51 of the airplanes in succession to be paralleled so that more pulses go to one particular airplane, thus providing for that one airplane a speed-up of service.

Referring to Fig. 6 a simplified schematic diagram of a patch board 152 for speed-up manifolding service is shown wherein for purposes of clarity only 25 segments of the interval timer 71 are shown. In order to handle 120 planes 200 segments should be provided, one for each plane and the remaining 80 divided into five groups of 16 segments each. The patch board 152 provides one contact 153a, 153b, 153c etc. for each plane to be handled. In addition, five patch cords 154—158 are provided. As rotating arm 77 of interval timer 25 makes contact with the contact segment 159a associated with the first plane a signal is coupled over line 159' causing relay 52a to close. As rotating arm 79 makes contact with segment 159b, the relay 52b associated with the second plane is closed, etc. The 80 spare segments 160 are coupled in groups of 16 to each of the patch cords 154—158. Thus, if patch cord 154 is coupled to jack 153a the first plane's relay 51a will be closed when rotating arm 77 makes contact with segment 159a, 160a, 160b, 160c etc. If patch cord 155 is coupled to jack 153b the relay associated with the second plane will be closed when rotating arm 77 makes contact with segments 159b, 161a, 161b, 161c etc. Thus, if any plane requires speed-up service such as might be necessary for instrument landings, it is possible to couple the patch cord to the associated jack for that plane and provide 17 contacts during a complete cycle instead of the one ordinary contact during a complete cycle.

While we have described above the principles of our invention in connection with specific apparatus, it is to be clearly understood that this description is made only by way of example and not as a limitation to the scope of our invention as set forth in the objects thereof and in the accompanying claims.

We claim:

1. A beacon system for mobile units, comprising an antenna having a directional radiation pattern, means to effect rotation of the radiation pattern of said antenna, a source of reference and bearing signal pulses, a source of mobile unit identifying signal pulses, a source of message signal pulses, and means to apply the reference, bearing, unit identifying and message signal pulses to said antenna in a given sequential order for amplitude modulation of said pulses in accordance with said rotating directional radiation pattern.

2. A beacon system for cooperating with a plurality of mobile units comprising an antenna having a directional radiation pattern, means to effect rotation of the radiation pattern of said antenna, a source of reference and bearing signal pulses, a plurality of sources of mobile unit identifying signal pulses one for each of said mobile units, a plurality of sources of message signal pulses one for each of said mobile units, and means to apply the reference, bearing, unit identifying and message signal pulses to said antenna in a given sequential order for amplitude modulation of said pulses in accordance with said rotating directional radiation pattern.

3. A beacon system according to claim 2 wherein said means to apply the reference, bearing, unit identifying and message signal pulses further includes distributor means to couple the message signal pulses for a selected one of said mobile units to said antenna following the unit identifying pulses for the selected mobile unit.

4. A beacon system according to claim 2 which further includes at said beacon means to apply the unit identifying pulses for each of said mobile units in succession during a given period of time.

5. A beacon system according to claim 4 which further includes at said beacon means to increase the relative number of times the unit identifying signal pulses for selected mobile units are applied to said antenna.

6. A beacon system for cooperating with a plurality of mobile units, comprising an antenna having a directional radiation pattern, means to effect rotation of the radiation pattern of said antenna, a source of reference signal pulses, a source of bearing signal pulses, a source of mobile unit identifying signal pulses associated with each of said mobile units, a source of message signal pulses associated with each of said mobile units, timer means responsive to said means to effect rotation of said radiation pattern to divide the rotation period of said pattern into a plurality of duty periods, and means to apply reference, bearing, unit identifying and message signal pulses to said antenna in a given sequential order during said duty periods for amplitude modulation of said pulses in accordance with said rotating directional radiation pattern.

7. A beacon system according to claim 6 which further includes distributor means responsive to said means to effect rotation to divide said duty periods into a plurality of unit periods and means to couple said sources of unit identifying signal pulses and said sources of message signal pulses to said antenna in succession during said unit periods.

8. A beacon system for cooperation with a plurality of mobile units capable of transmitting interrogation pulses, comprising an antenna having a directional radiation pattern, means to effect rotation of said radiation pattern, means to detect transmitted interrogation signals, a source of bearing signal pulses responsive to said detected interrogation pulses, a source of reference signal pulses, a source of unit identifying pulses, a source of message signal pulses, a source of pattern sampling signal pulses inversely responsive to the output of said source of bearing signal pulses, and means to apply said reference, bearing, pattern sampling, unit identifying and message signal pulses to said antenna in a given sequential order for amplitude modulation of said pulses in accordance with said rotating directional radiation pattern.

9. A navigation system comprising a beacon system including at least an antenna having a directional radiation pattern, means to effect rotation of the radiation pattern of said antenna, a source of reference and bearing signal pulses, a source of mobile unit identifying signal pulses, a source of message signal pulses, and means to apply the reference, bearing, unit identifying and message signal pulses to said antenna in a given sequential order for amplitude modulation of said pulses in accordance with said rotating directional radiation pattern, and a mobile unit having means to detect said radiated signal pulses, means to compare said reference signal pulses with said detected radiation pattern to obtain an indication of bearing of said unit from said beacon, means to recognize said mobile unit identifying signal pulses and means to demodulate said message signal pulses.

10. A navigation system according to claim 9 wherein said mobile unit further includes a transmitter, a source of position data signal pulses, and means to couple said position data signal pulses to said transmitter responsive to said detected unit identifying signal pulses.

11. A navigation system according to claim 9 wherein said mobile unit further includes a transmitter, a source of interrogation signal pulses and means to couple said interrogation signal pulses to said transmitter and said beacon further includes means to detect said transmitted interrogation pulses, said source of bearing signal pulses being responsive to said detected interrogation signal pulses and means at said mobile unit to measure the elapsed time between the transmission of said interrogation signal pulses and the detection of said responsive bearing signal pulses.

12. A navigation system according to claim 9 wherein said mobile unit further includes a transmitter, a source of position data signal pulses, means to couple said position data signal pulses to said transmitter responsive to said detected unit identifying signal pulses, a source of interrogation signal pulses and means to couple said interrogation signal pulses to said transmitter and said beacon further includes means to detect said transmitted interrogation pulses, said source of bearing signal pulses being responsive to said detected interrogation signal pulses and means at said mobile unit to measure the elapsed time between the transmission of said interrogation signal pulses and the detection of said responsive bearing signal pulses.

13. A navigation system according to claim 12 which further includes at said mobile unit means to suppress said interrogation signal pulses and means at said beacon to suppress said bearing signal pulses for a predetermined period of time during each rotation of said radiation pattern.

14. A navigation system according to claim 13 which further includes at said beacon a source of fill-in signal pulses, means to couple said source of fill-in pulses to said antenna during said predetermined period of time, and means to gate the means for coupling said source of fill-in signal pulses to prevent the application of said fill-in signal pulses to said antenna during the radiation of other signal pulses.

15. A navigation system comprising a beacon capable of servicing a plurality of mobile units, including an antenna having a directional radiation pattern, means to effect rotation of the radiation pattern of said antenna, a source of reference signal pulses, a source of constant amplitude pattern sampling signal pulses, a source of unit identifying signal pulses associated with each of said mobile units, a source of message signal pulses associated with each of said mobile units, means responsive to said means to effect rotation to apply said reference pattern sampling, unit identifying and message signal pulses to said antenna in a given sequential order for amplitude modulation of said pulses in accordance with said rotating directional radiation pattern, each of said mobile units including means to detect said signal pulses, means to compare said detected signal pulses and said reference pulses to thereby obtain a bearing with respect to said beacon, a transmitter, a source of position data signal pulses, means to couple said position data signal pulses to said transmitter responsive to the detection of predetermined unit identifying signal pulses, a source of interrogation signal pulses, means to apply said interrogation signal pulses to said transmitter, and further means at said beacon to detect said transmitted position data signal pulses and interrogation signal pulses, means to trigger said source of pattern sampling signal pulses responsive to said detected interrogation signal pulses, and means at said mobile unit to measure the elapsed time between the transmission of said interrogation signal pulses and the detection of said triggered pattern sampling pulses to thereby obtain its distance from said beacon.

16. A navigational system according to claim 15 wherein said mobile unit further includes a source of precursor signal pulses and means to apply said precursor signal pulses to said transmitter prior to said position data signal pulses.

17. A mobile unit to cooperate with a beacon transmitting a rotating, directional radiation pattern of amplitude modulated pulses including bearing, reference, unit identifying and message signal pulses, comprising means to detect said reference, bearing, unit identifying and message signal pulses, means to detect the envelope wave of said radiation pattern, means to compare the phase of said envelope wave and said detected reference signal to thereby obtain the bearing of said beacon from said mobile unit, a transmitter, a source of position data signal pulses, means responsive to predetermined detected unit identifying signal pulses to apply said position data signal pulses to said transmitter and means responsive only to detected message signal pulses following a predetermined detected unit identifying signal pulses for demodulating message signal pulses.

18. A mobile unit to cooperate with a beacon transmitting a rotating directional radiation pattern of amplitude modulated pulses including bearing signal pulses responsive to detected interrogation signal pulses, reference, unit identifying and message signal pulses, comprising means to detect said reference, bearing, unit identifying and message signal pulses, means to detect the envelope wave of said radiation pattern, means to compare the phase of said envelope wave and said detected reference signal to thereby obtain the bearing of said beacon from said mobile unit, a transmitter, a source of position data signal pulses, means responsive to predetermined detected unit identifying signal pulses to apply said position data signal pulses to said transmitter and means responsive only to detected message signal pulses following a predetermined detected unit identifying signal pulses for demodulating message signal pulses, a source of interrogation signal pulses, means to couple said interrogation signal pulses to said transmitter, and means to measure the elapsed time between the transmission of said interrogation signal pulses and the detection of said responsive bearing signal pulses to thereby obtain the distance of said unit from said beacon.

19. A mobile unit to cooperate with a beacon transmitting a rotating directional radiation pattern of amplitude modulated pulses including bearing signal pulses responsive to detected interrogation signal pulses, reference, unit identifying and message signal pulses, comprising means to detect said reference, bearing, unit identifying and message signal pulses, means to detect the envelope wave of said radiation pattern, means to compare the phase of said envelope wave and said detected reference signal to thereby obtain the bearing of said beacon from said mobile unit, a transmitter, a source of interrogation signal pulses and means to couple said interrogation signal pulses to said transmitter, and means to measure the elapsed time between the transmission of said interrogation signal pulses and the detection of said responsive bearing signal pulses to thereby obtain the distance of said unit from said beacon.

20. An antenna system for use with a navigation system comprising antenna means having a directional radiation pattern, means to effect rotation of the radiation pattern of said antenna means, timer means responsive to said means to effect rotation to divide the rotation period into a plurality of time intervals and distributor means responsive to said means to effect rotation to subdivide one of said time intervals into a plurality of sub-intervals.

References Cited in the file of this patent

UNITED STATES PATENTS 2,666,198    Wallace _____ Jan. 12, 1954

FOREIGN PATENTS 635,487    Great Britain _____ Apr. 12, 1950